(12) United States Patent
Takagi

(10) Patent No.: US 8,554,291 B2
(45) Date of Patent: *Oct. 8, 2013

(54) SLIDING PORTABLE TELEPHONE

(71) Applicant: Fujitsu Limited, Kawasaki (JP)

(72) Inventor: Hisamitsu Takagi, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

This patent is subject to a terminal disclaimer.

(21) Appl. No.: 13/666,136

(22) Filed: Nov. 1, 2012

(65) Prior Publication Data

US 2013/0059629 A1 Mar. 7, 2013

Related U.S. Application Data

(63) Continuation of application No. 11/878,772, filed on Jul. 26, 2007, which is a continuation of application No. PCT/JP2005/002636, filed on Feb. 18, 2005.

(51) Int. Cl.
*H04M 1/00* (2006.01)

(52) U.S. Cl.
USPC .................................................. 455/575.4

(58) Field of Classification Search
USPC ........... 455/550.1, 556.1, 575.1, 575.4, 575.8
See application file for complete search history.

(56) References Cited

U.S. PATENT DOCUMENTS

| | | | |
|---|---|---|---|
| 6,605,038 B1 | 8/2003 | Teller et al. | |
| 6,898,301 B2 | 5/2005 | Iwanaga | |
| 6,973,186 B2 | 12/2005 | Shin | |
| 7,252,511 B2 | 8/2007 | Santos et al. | |
| 7,353,052 B2 | 4/2008 | Yamasaki | |
| 7,616,261 B2 | 11/2009 | Kitamura et al. | |
| 2003/0064688 A1 | 4/2003 | Mizuta et al. | |
| 2003/0211874 A1 | 11/2003 | Mizuta et al. | |
| 2004/0132490 A1* | 7/2004 | Jerbi et al. ................ | 455/556.1 |
| 2004/0198437 A1 | 10/2004 | Yamamoto et al. | |

(Continued)

FOREIGN PATENT DOCUMENTS

| | | |
|---|---|---|
| CN | 1461134 A | 12/2003 |
| CN | 1159890 C | 7/2004 |

(Continued)

OTHER PUBLICATIONS

Japanese Patent Office Action mailed Oct. 11, 2011, for corresponding Japanese Patent Application No. 2010-149228.

(Continued)

*Primary Examiner* — Christian Hannon
(74) *Attorney, Agent, or Firm* — Staas & Halsey LLP

(57) ABSTRACT

A sliding portable telephone in which a second display section is provided on a surface exposed when an upper housing is slid, enabling self-shooting by a built-in camera. Further, in the telephone, a mechanism for stopping the upper housing before a fully opened position is provided so that, when a fingerprint sensor is built-in in an end section of a lower housing, fingerprint authentication is enabled without fully opening the telephone. Also, a recess is formed between sliding surfaces of the upper and lower housings, a flexible circuit board is received in the recess, the flexible circuit board is inserted and led through a slit that is provided only in one end surface of the recess, the insertion section is sealed, and as a result, there is no problem even if water droplets are splashed on the sliding portable telephone in an extended state.

4 Claims, 13 Drawing Sheets

(56) References Cited

U.S. PATENT DOCUMENTS

| | | |
|---|---|---|
| 2004/0204202 A1 * | 10/2004 | Shimamura et al. ........ 455/575.1 |
| 2004/0239799 A1 | 12/2004 | Suzuki et al. |
| 2004/0257334 A1 | 12/2004 | Yajima |
| 2005/0221873 A1 | 10/2005 | Kameyama et al. |
| 2008/0167098 A1 | 7/2008 | Mizuta et al. |

FOREIGN PATENT DOCUMENTS

| | | |
|---|---|---|
| JP | 8-162243 | 6/1996 |
| JP | 2000-156127 | 6/2000 |
| JP | 2002-124779 | 4/2002 |
| JP | 2003-32335 | 1/2003 |
| JP | 2003-179678 | 6/2003 |
| JP | 2003-298699 | 10/2003 |
| JP | 2003-319042 | 11/2003 |
| JP | 2004-172691 | 6/2004 |
| JP | 2004-253480 | 9/2004 |
| JP | 2004-350208 | 12/2004 |
| JP | 2005-32752 | 2/2005 |
| JP | 2006-81113 | 3/2006 |
| KR | 20-0324927 | 9/2003 |
| KR | 20-0374450 | 1/2005 |
| KR | 20-0376773 | 3/2005 |

OTHER PUBLICATIONS

Japanese Patent Office Action mailed Mar. 30, 2010 for corresponding Japanese Patent Application No. 2007-506917.
Korean Official Action dated Mar. 12, 2008.
U.S. Appl. No. 11/878,772, filed Jul. 26, 2007, Hisamitsu Takagi, Fujitsu Limited.
Japanese Office Action mailed Aug. 4, 2009 in corresponding Japanese Patent Application No. 2007-506917.
Japanese Office Action mailed Nov. 24, 2009 in corresponding Japanese Patent Application No. 2007-506917.
Office Action mailed Oct. 5, 2010 in U.S. Appl. No. 11/878,772.
Office Action mailed Mar. 19, 2010 in U.S. Appl. No. 11/878,772.
Notice of Allowance mailed Nov. 9, 2012, in U.S. Appl. No. 11/878,772.

* cited by examiner

Fig.4
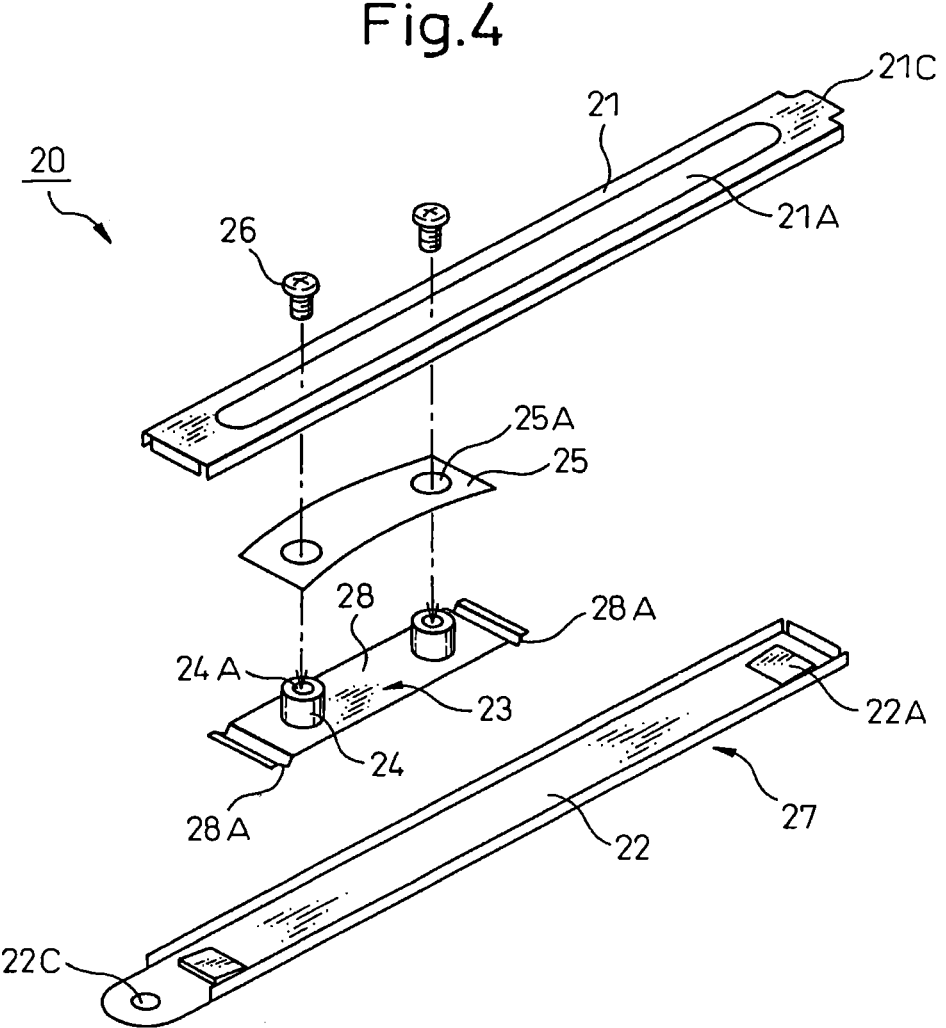
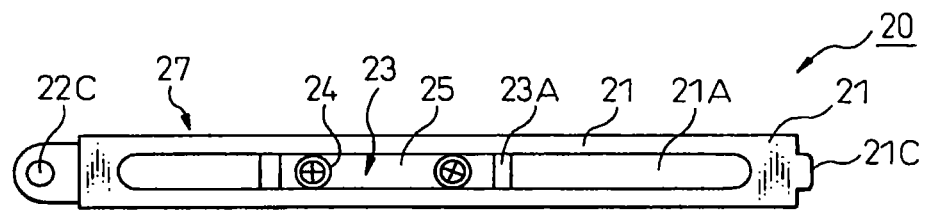
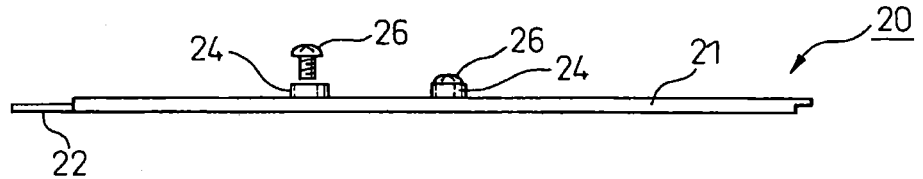

Fig.5
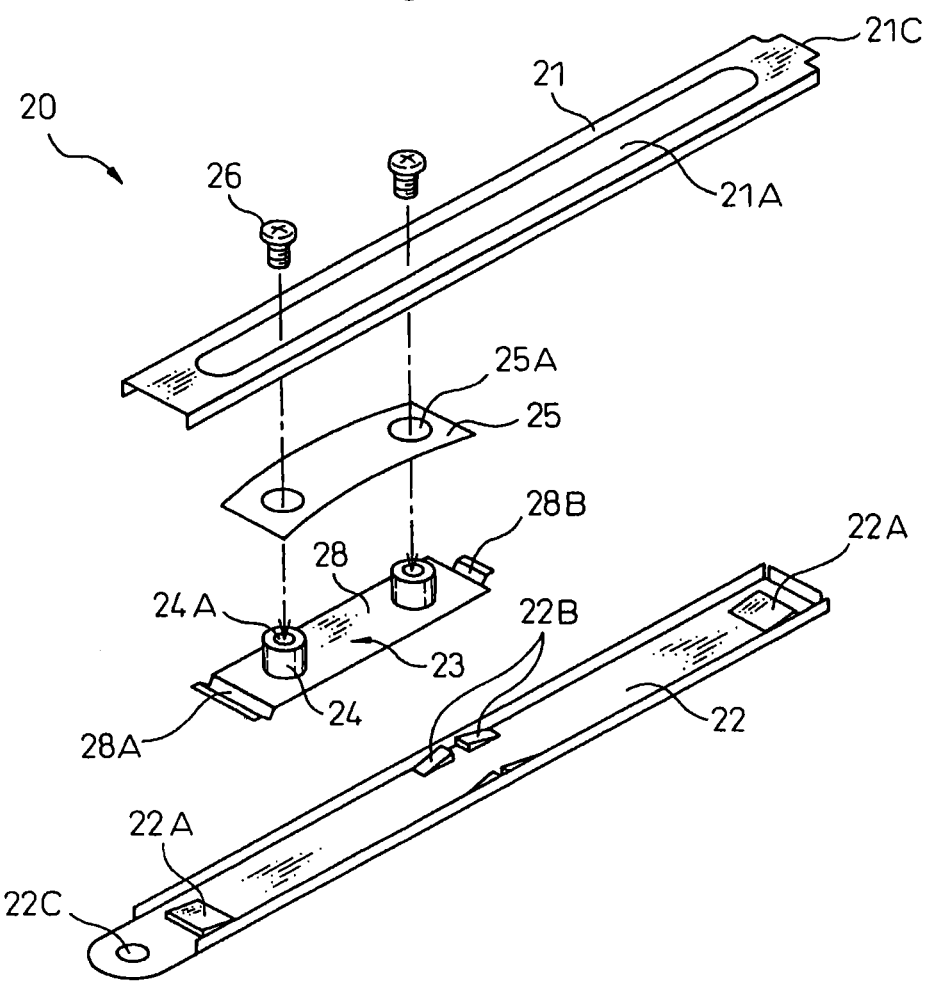
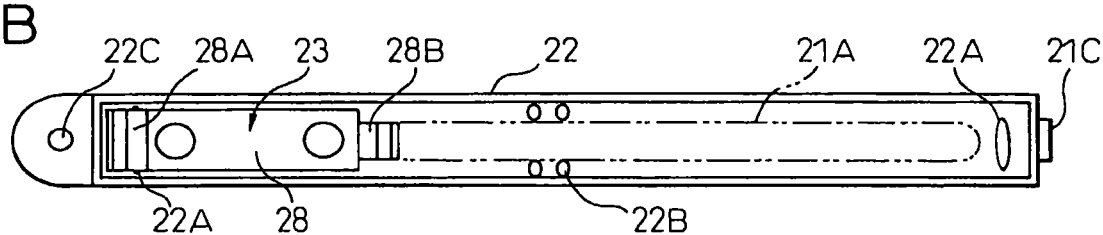
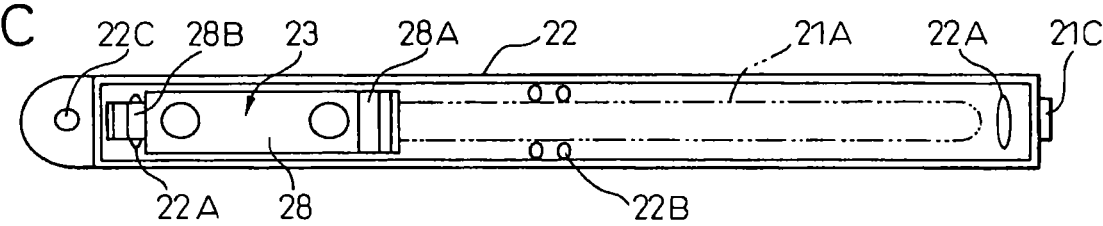

Fig.6
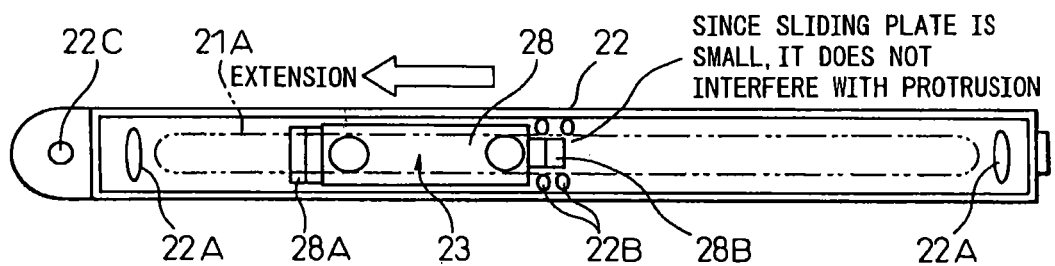
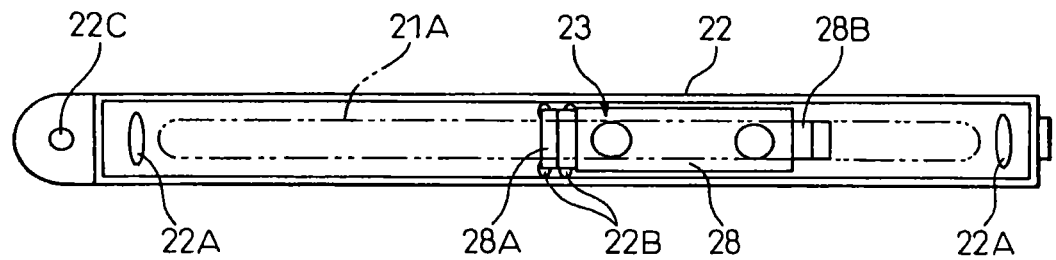
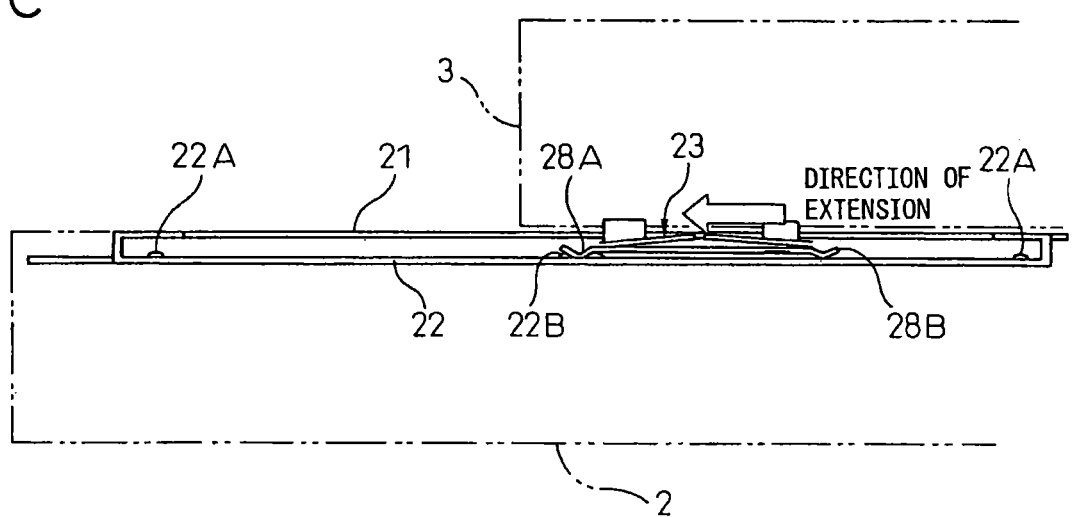

Fig. 7
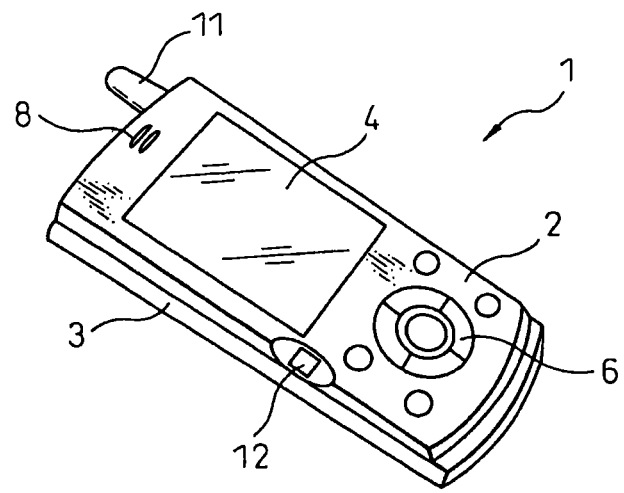
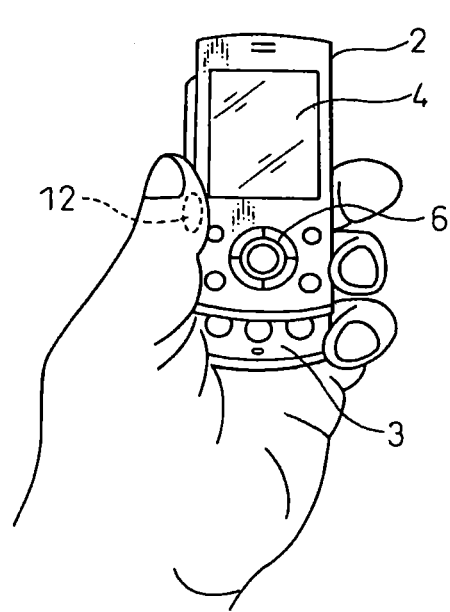
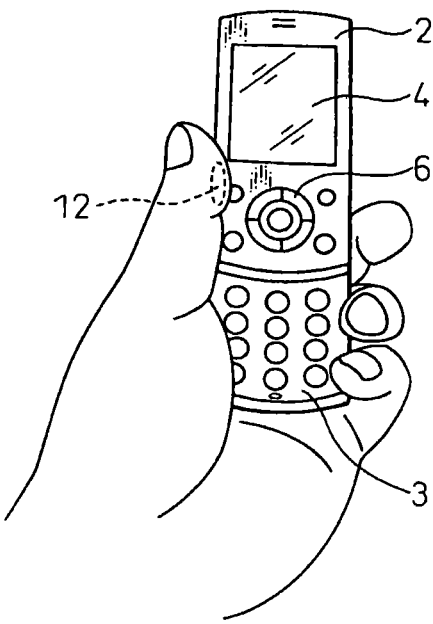

Fig. 8
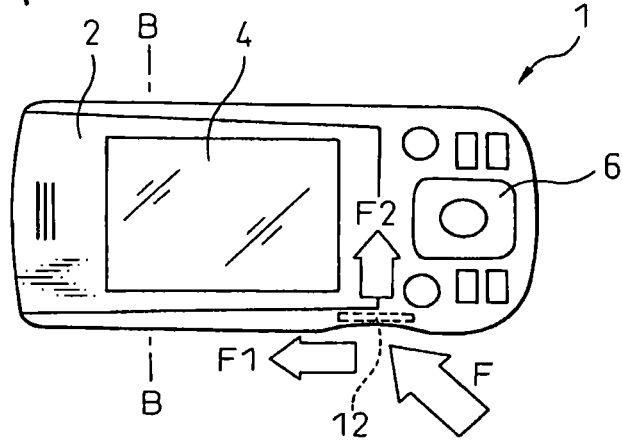
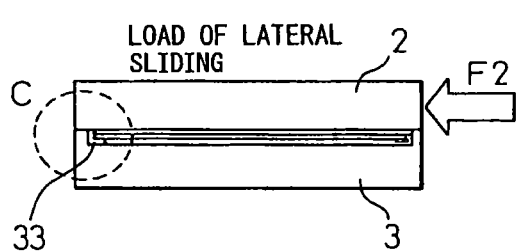
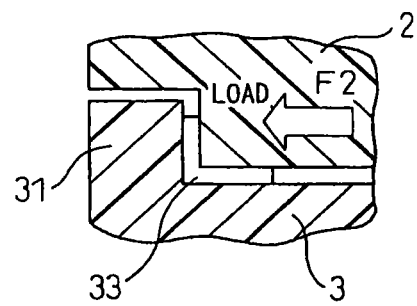
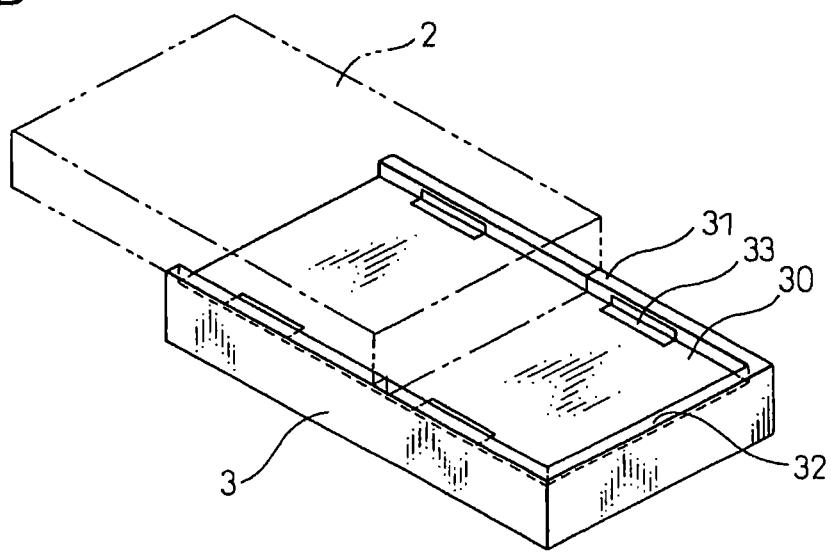

Fig. 9
A
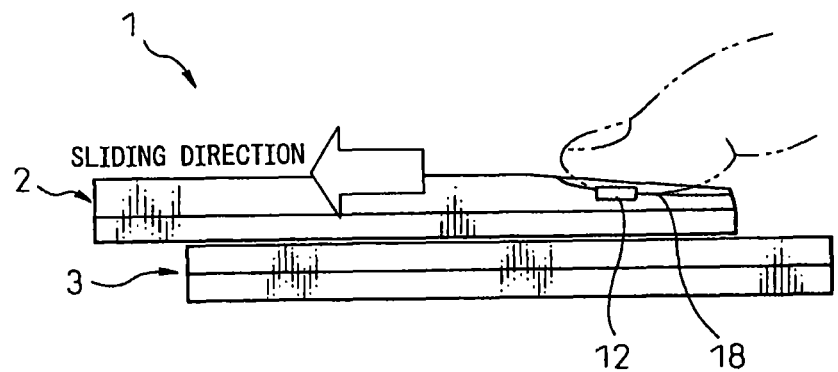
B
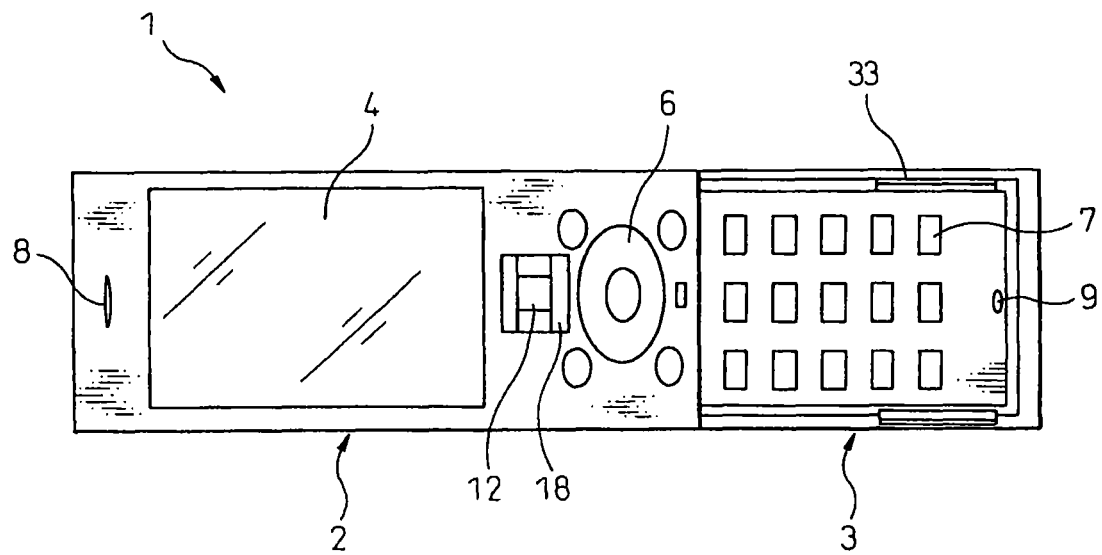

Fig.10
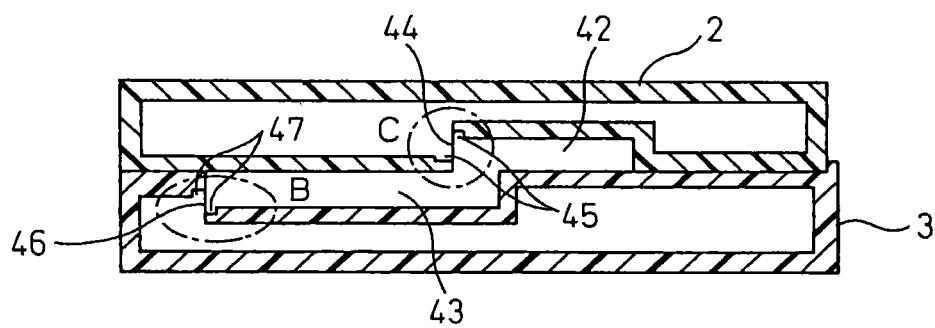
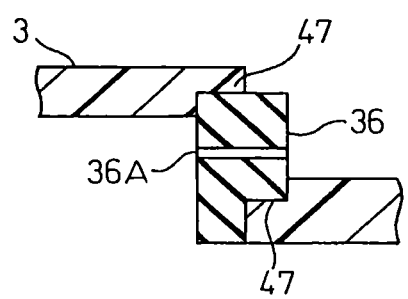 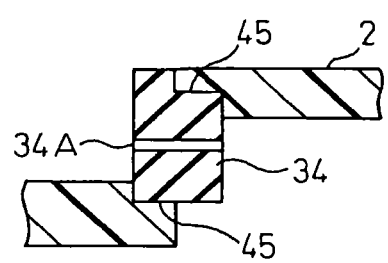
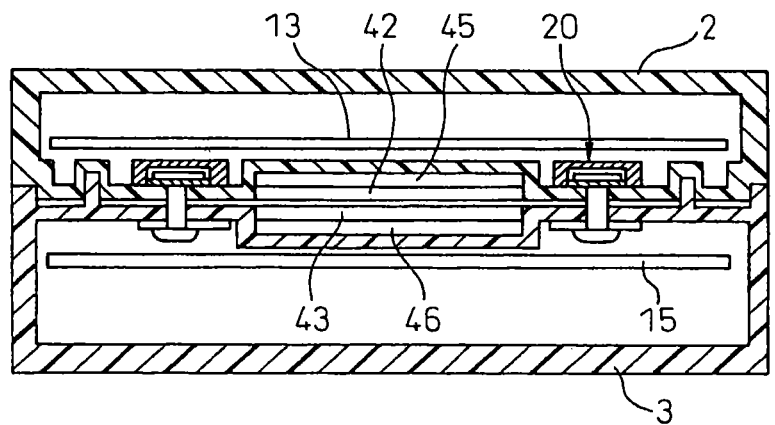

Fig.11
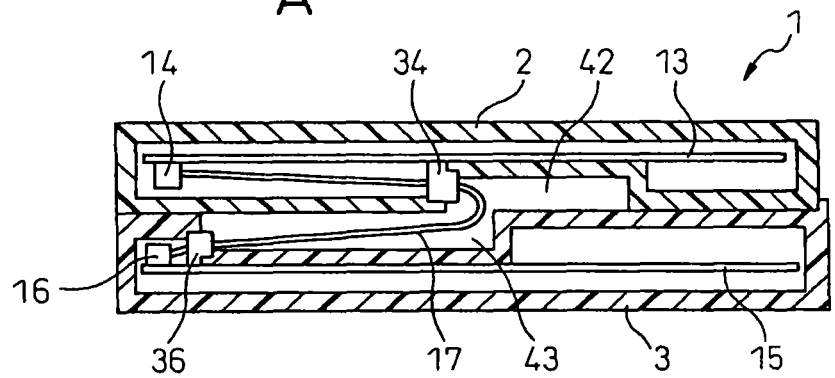
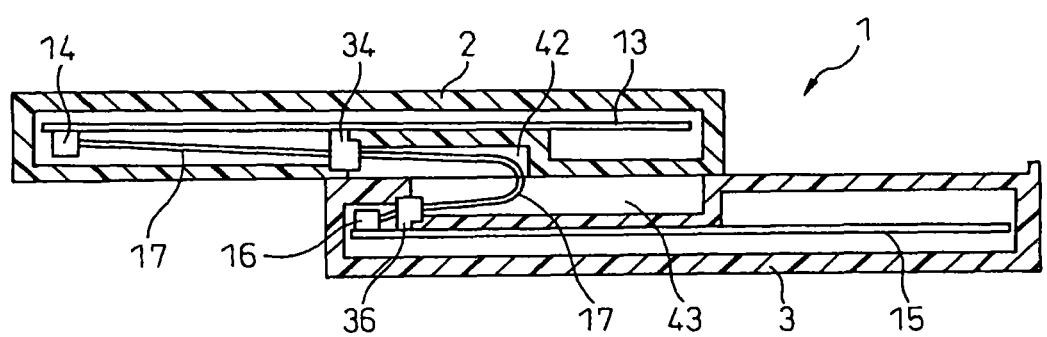
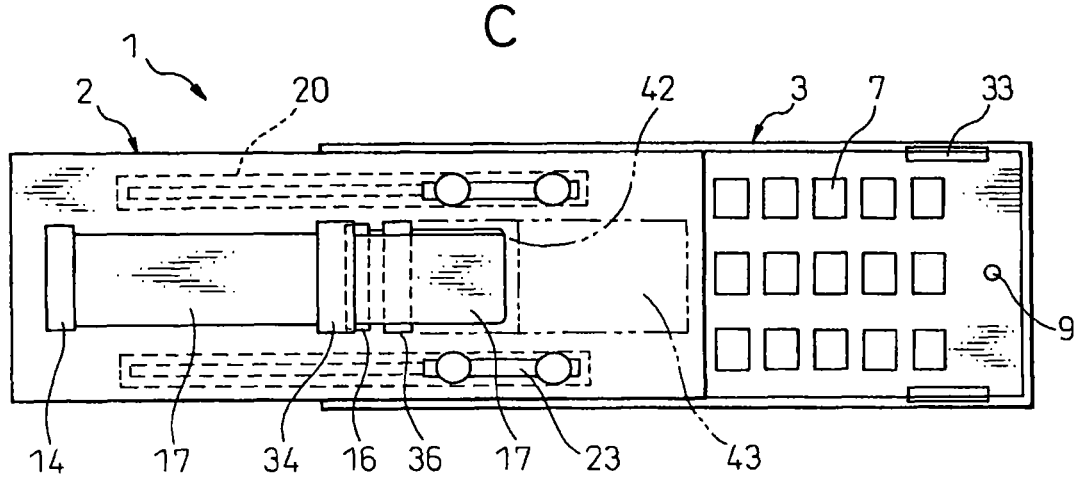

Fig.12
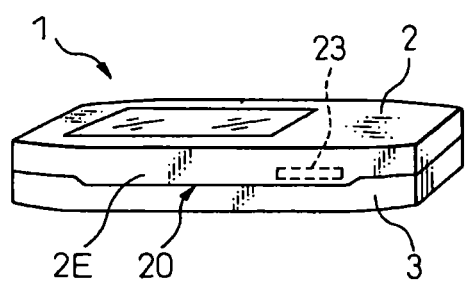
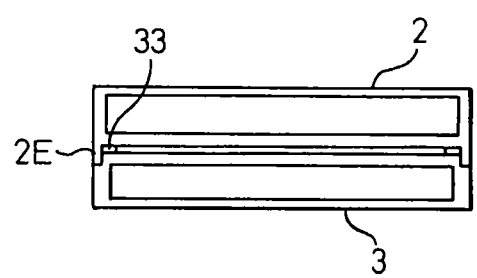
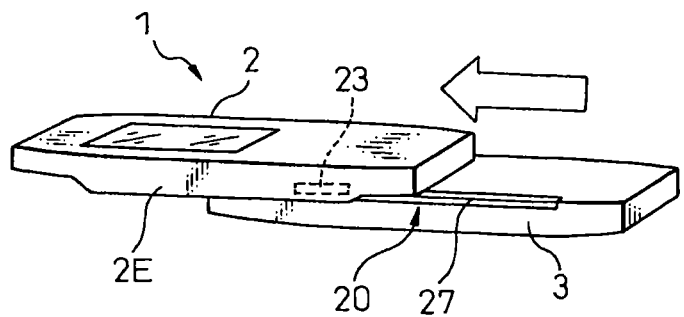
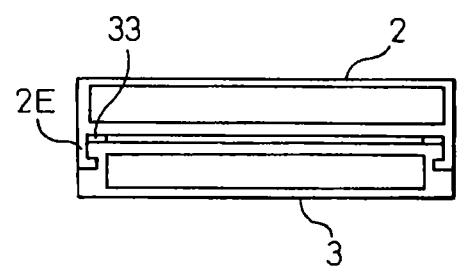

Fig.13
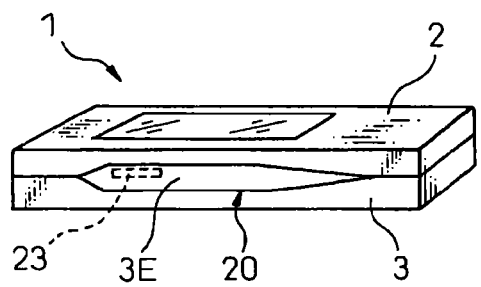
A
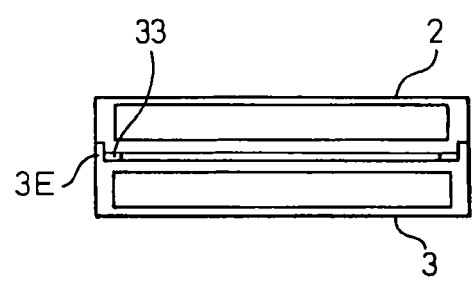
C
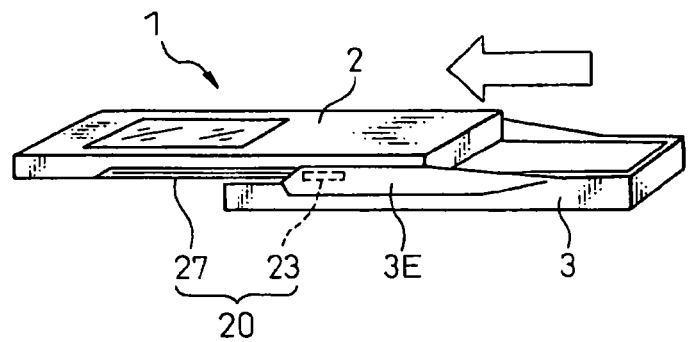
B
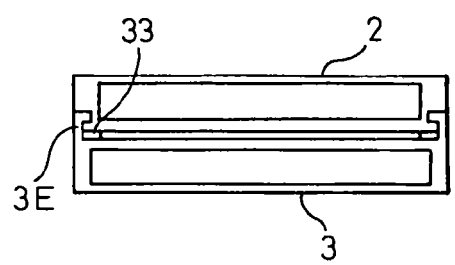
D

SLIDING PORTABLE TELEPHONE

CROSS-REFERENCE TO RELATED APPLICATIONS

This application is a continuation of application U.S. Ser. No. 11/878,772, filed Jul. 26, 2007, which is a continuation application of PCT/JP2005/002636 filed Feb. 18, 2005, the contents being incorporated herein by reference.

TECHNICAL FIELD

The present invention is related to a sliding portable telephone. More particularly, the present invention is related to a handy sliding portable telephone.

BACKGROUND ART

Recently, portable telephones have come into wide use. In the beginning, portable telephones, the shapes of which were longitudinally long, were mainly used. However, in order to enhance the portability of portable telephones by reducing the length, folding type portable telephones are mainly used in which the housing of each portable telephone is divided into an upper housing and a lower housing, and the divided upper and lower housings are placed on each other and opened and closed by being rotated around a rotary shaft arranged on one end of the upper and lower housings.

When the folding type portable telephone is carried by a user, it is folded. When the user makes a phone call, the portable telephone is extended so that a microphone and a receiver of the portable telephone can be brought close to the ear and the mouth of the user to utilize the acoustic characteristic of the portable telephone. However, the functions of portable telephones have recently multiplied. Portable telephones have recently come into wide use which have an internet connecting function, a digital camera function shown in JP-A-2003-179678 and a television function in addition to a mail function by which characters or photographs are sent to another party's portable telephone. Further, portable telephones having a finger print authentication function, which is shown in Patent Document 1, have been developed. Therefore, in addition to the functions used when the folded housings are opened, the number of functions, which can be used even when the folded housings are closed, is increasing.

Concerning the form in which the length of the portable telephone is reduced, except for the aforementioned form in which the upper and lower housings are folded, a rotary form is provided in which a rotary shaft is arranged perpendicularly to a face on which the upper and the lower housing are placed on each other and the upper housing is rotated with respect to the lower housing 180° around this rotary shaft so as to extend the length of the portable telephone. Further, a sliding form is provided in which the upper housing is slid with respect to the lower housing when sliding rails are arranged on the face on which the upper and the lower housing are placed on each other or when a tunnel structure is provided on the face on which the upper and the lower housing are place on each other. Concerning this form, refer to JP-A-2003-179678 and JP-A-2003-32335.

In these sliding portable telephones, in the portable telephone in which the upper and the lower housing are connected to each other by sliding rails, in order to prevent the sliding rails and the upper and the lower housing from being separated from each other, a structure is provided by which the upper housing is prevented from being drawn out from the sliding rails in the sliding rail moving direction. Concerning this structure, refer to JP-A-2003-179678. This sliding structure is convenient for the user of the portable telephone since the portable telephone can be used both at a short length (i.e. not fully slid) and at a long length (i.e. fully slid) according to the situation, that is, this sliding structure effectively widens the usage of the portable telephone.

JP-A-2003-179678: Japanese Patent Unexamined Publication No. 2003-179678 (Refer to reference numerals 104 and 105 in FIG. 2)

JP-A-2003-179678: Japanese Patent Unexamined Publication No. 2003-179678 (Refer to FIGS. 3 and 4 and the explanations)

JP-A-2003-32335: Japanese Patent Unexamined Publication No. 2003-32335 (Refer to FIGS. 1 and 2 and the explanations)

DISCLOSURE OF THE INVENTION

Problems to be Solved by the Invention

The following problems may be encountered in the conventional sliding portable telephone.

(1) In the case of taking a photograph with a camera under the contracted condition that the upper and the lower housing are placed on each other, since a lens of the camera is arranged on the back face of the lower housing, in the case of self-shooting, it is impossible for a user to see his own image.

(2) In the case of a conventional sliding portable telephone provided with a fingerprint sensor, the fingerprint sensor is arranged on the back side of the upper housing which is not related to the extending and contracting operation of the portable telephone. Therefore, it is necessary to conduct fingerprint authentication separately from the extending and contracting operation. That is, only after the upper housing has been drawn out from the lower housing, the fingerprint sensor can be used.

(3) The conventional sliding portable telephone does not have a splash-proof structure on the sliding face. Therefore, when the sliding portable telephone is extended, liquid can easily enter into it. Especially, liquid can enter into the sliding portable telephone through a flexible cable for connecting the upper housing with the lower housing. When such soaked liquid comes in contact with a connector, electrical problems may be caused.

It is an object of the present invention to provide a sliding portable telephone characterized in that: self-shooting can be easily conducted with a built-in camera; even when the sliding portable telephone is not extended, it is possible to conduct fingerprint authentication; and no problems are caused even if water droplets are splashed on the sliding portable telephone in an extended state.

Means for Solving the Problems

In order to accomplish the above object, the present invention provides a sliding portable telephone in which an upper housing and a lower housing overlap each other through sliding rails and an overlapping face is gradually exposed when the upper housing and the lower housing are slid from each other. The sliding portable telephone can be realized by the following embodiments.

The sliding portable telephone of the first embodiment comprises: an operating portion having keys provided on a face of the lower housing which is exposed at the time of sliding; a first display portion provided on a face of the upper housing which is exposed at all times; and a second display portion provided on a face of the upper housing which is exposed at the time of sliding.

The sliding portable telephone of the second embodiment further comprises a lens of a camera built in the telephone provided on a face of the lower housing exposed at all times.

The sliding portable telephone of the third embodiment further comprises: a finger putting recess portion for sliding the upper housing, provided on a side of the upper housing; side walls and groove portions corresponding to the side walls extended in a sliding direction of the overlapping face of the upper housing and the lower housing, arranged at positions on both sides of the overlapping face of the upper housing and the lower housing; and a sliding assisting member made of a low friction material for receiving a thrust force given in a direction perpendicular to the sliding direction and for reducing abrasion caused by friction generated in the sliding direction, the sliding assisting member being arranged in a primary portion of one of the side walls and the groove portions. A fingerprint sensor can be arranged in the finger putting recess portion.

The sliding portable telephone of the fourth embodiment further comprises: a recess portion for accommodating a flexible cable to connect the upper housing with the lower housing, provided on the overlapping face of the upper housing and the lower housing, the recess portion on the overlapping face of the upper housing being formed from a central portion onto a side opposite to the sliding direction by a predetermined length, the recess portion on the overlapping face of the lower housing being formed from a central portion in a sliding direction of the upper housing by a predetermined length; and a through-hole into which the flexible cable is inserted, formed at a front end portion in the sliding direction of the upper housing of the recess portion, wherein the through-hole is water-tightly sealed by a sealing member under the condition that the flexible cable is inserted into the through-hole inside the upper housing and the lower housing.

The sliding portable telephone of the fifth embodiment further comprises: lock mechanisms arranged at both end portions and an intermediate portion of the sliding rails; and a fingerprint sensor arranged in a portion of the lower housing exposed when the upper housing is slid and locked in the intermediate portion. In this case, the upper housing and the lower housing are combined with each other by a sliding module having sliding rails, a sliding member moving along these sliding rails and a sliding spring for pushing the sliding member to the sliding rails, the locking mechanism includes an intermediate locking protrusion provided in a neighborhood of a central portion of the sliding rail and also includes an engaging portion for engaging with the intermediate locking protrusion, provided in a portion of the sliding spring, and the intermediate locking protrusion is engaged with a portion of the sliding spring only once while the upper housing is sliding with respect to the lower housing at the maximum.

The sliding rail further includes an open locking protrusion for holding an open state in which the upper housing and the lower housing are fully slid and also includes a closed locking protrusion for holding a state in which the upper housing and the lower housing are closed, two intermediate locking protrusions are arranged in both side portions in the width direction of the sliding rail so that a locking groove can be formed between the two intermediate locking protrusions, a first engaging portion having a width of engaging with the locking groove and the open locking protrusion is provided at a front end portion in the sliding direction of the sliding spring, and a second engaging portion having a width of engaging only with the closed locking protrusion, provided at a rear end portion in the sliding direction of the sliding spring.

The sliding portable telephone of the eighth embodiment further comprises: a recess portion, on which a finger is put so as to push the upper housing in the sliding direction, provided in a lower end portion in the sliding direction of the upper housing; and a fingerprint sensor provided on a bottom face of the recess portion. Fingerprint authentication is carried out by the fingerprint sensor before the upper housing is fully slid with respect to the lower housing.

Advantage of the Invention

According to the sliding portable telephone of the present invention, self-shooting can be easily made with a camera built in the sliding portable telephone. Further, it is possible to carry out fingerprint authentication even when the sliding portable telephone, into which a fingerprint sensor is incorporated, is not extended. Furthermore, even when water droplets are splashed on the sliding portable telephone in an extended state, no problems are caused because a water-proof structure is provided in the sliding portable telephone.

BRIEF DESCRIPTION OF THE DRAWINGS

FIG. 4A is an assembling perspective view showing a constitution of a sliding rail used for the first embodiment of the present invention.

FIG. 4B is a plan view showing the sliding rail, which has been assembled, shown in FIG. 4A.

FIG. 4C is a side view of FIG. 4B.

FIG. 5A is an assembling perspective view showing a constitution of a sliding rail used for the second embodiment of the present invention.

FIG. 5B is a schematic illustration showing a state in which the sliding plate shown in FIG. 5A is locked at an end portion of a lower cover.

FIG. 5C is a schematic illustration showing a state in which the sliding plate shown in FIG. 5A is inserted into the lower cover being inverted in the sliding direction and the thus inverted sliding plate is locked at an end portion of the lower cover.

FIG. 6A is a schematic illustration showing a state in which the sliding plate is not locked although the sliding plate is relatively moved with respect to the lower cover in the state shown in FIG. 5B.

FIG. 6B is a schematic illustration showing a state in which the sliding plate is further relatively moved with respect to the lower cover in the state shown in FIG. 6A and locked in an intermediate portion of a lower rail.

FIG. 6C is a side view of FIG. 6B, that is, FIG. 6C is a schematic illustration showing a relationship between the upper cover, into which the sliding rail is integrated, and the lower cover.

FIG. 7A is a perspective view showing a front side of a sliding portable telephone having a fingerprint sensor, which is closed, of the third embodiment of the present invention.

FIG. 7B is a schematic illustration showing a state in which a sliding portable telephone is slid when the thumb of a user is put onto the fingerprint sensor portion of the sliding portable telephone of FIG. 7A.

FIG. 7C is a schematic illustration showing a full-open state of the sliding portable telephone shown in FIG. 7B.

FIG. 8A is a plan view showing a front side of a sliding portable telephone having a fingerprint sensor, which is in a closed-state, of a variation of third embodiment of the present invention.

FIG. 8B is a sectional view taken on line B-B in FIG. 8A.

FIG. 8C is an enlarged view of a portion shown by broken line C in FIG. 8B.

FIG. 8D is a perspective view showing an example of the position at which a strengthening member shown in FIGS. 8B and 8C is arranged in a lower housing.

FIG. 9A is a side view showing a state in which a sliding portable telephone of the fourth embodiment of the present invention having a fingerprint sensor is opened.

FIG. 9B is a plan view showing a state in which the sliding portable telephone of the fourth embodiment of the present invention is fully opened.

FIG. 10A is a sectional view showing only an upper housing and a lower housing of the sliding portable telephone of the fourth embodiment of the present invention.

FIG. 10B is an enlarged view showing a portion shown by one-dotted chain line B in FIG. 10A.

FIG. 10C is an enlarged view showing a portion shown by one-dotted chain line C in FIG. 10A.

FIG. 10D is a sectional view showing a primary portion in the width direction of the sliding portable telephone in which a position of the hole, into which the flexible circuit board is inserted, is shown in FIGS. 10A to 10C.

FIG. 11A is a sectional view in the longitudinal direction of the sliding portable telephone, which is in a closed state, showing the flexible circuit board for connecting the upper housing with the lower housing of the sliding portable telephone of the fourth embodiment of the present invention and also showing a sealing member for sealing the flexible circuit board.

FIG. 11B is a sectional view showing a full-open state of the sliding portable telephone shown in FIG. 11A.

FIG. 11C is a perspective plan view of the sliding portable telephone shown in FIG. 11B.

FIG. 12A is a perspective view showing an outline of a closed-state of the sliding portable telephone of the fifth embodiment of the present invention.

FIG. 12B is a perspective view showing an outline of a full-open state of the sliding portable telephone of FIG. 12A.

FIG. 12C is a sectional view showing an outline of an example of a constitution of an extended portion of the sliding portable telephone of FIG. 12A.

FIG. 12D is a sectional view showing an outline of another example of the constitution of the extended portion of the sliding portable telephone of FIG. 12A.

FIG. 13A is a perspective view showing an outline of a sliding portable telephone, which is in a closed state, of the sixth embodiment of the present invention.

FIG. 13B is a perspective view showing the sliding portable telephone, which is in a full open state, of FIG. 13A.

FIG. 13C is a sectional view showing an outline of an example of a constitution of an extending portion of the sliding portable telephone of FIG. 13A.

FIG. 13D is a sectional view showing an outline of another embodiment of the constitution of the extending portion of the sliding portable telephone of FIG. 13A.

PREFERRED EMBODIMENTS FOR CARRYING OUT THE INVENTION

Figure 1:
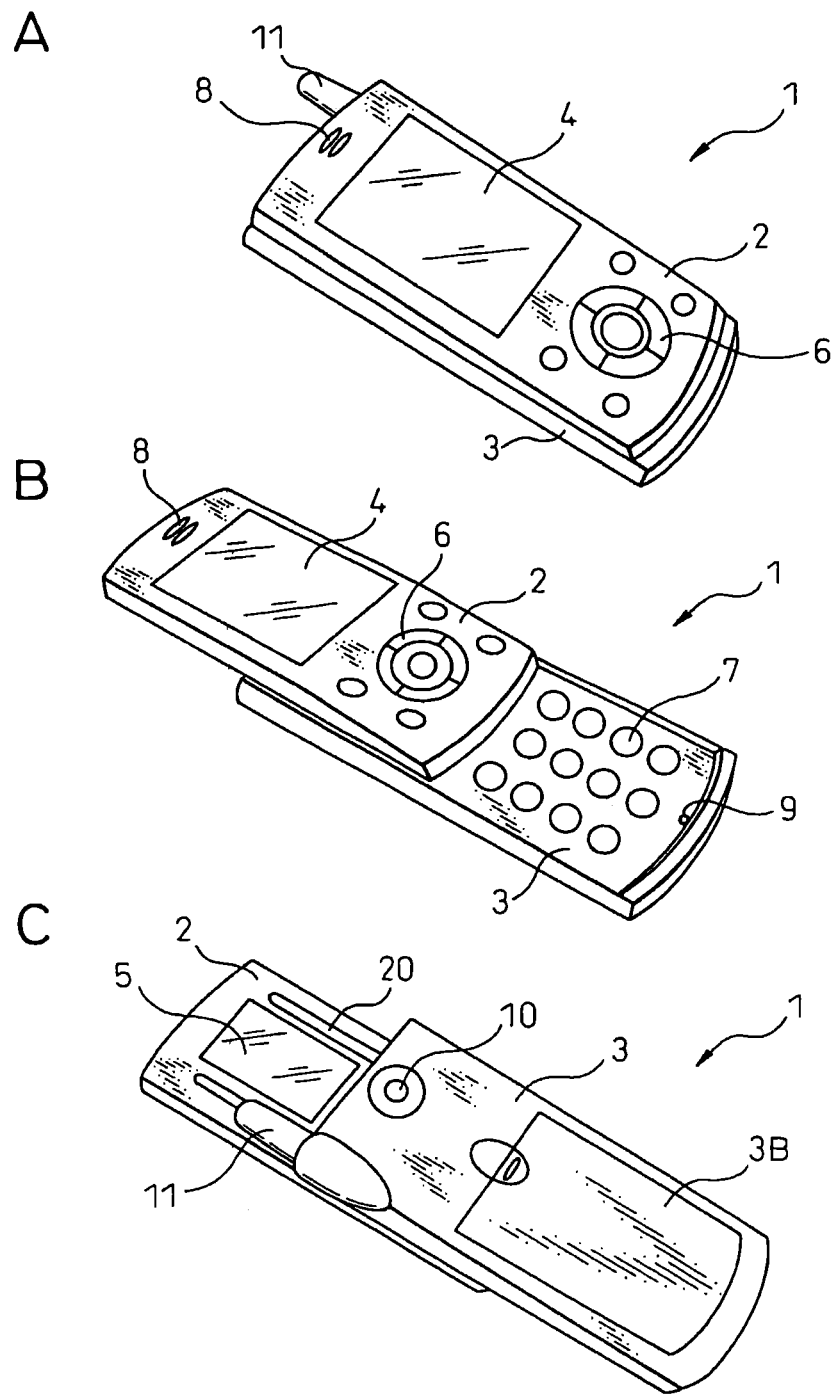
FIG. 1A is a perspective view showing a front side of a sliding portable telephone, which is in a closed state, of the first embodiment of the present invention.
FIG. 1B is a perspective view showing an open state of the sliding portable telephone of FIG. 1A.
FIG. 1C is a perspective view showing a back side of the sliding portable telephone of FIG. 1B.

Referring to the drawings, preferred embodiments of the present invention will be explained below. In the explanation, like reference characters are used to indicate like parts in the embodiments.

FIG. 1A is a view showing a front side of a sliding portable telephone 1, which is in a closed state, of the first embodiment of the present invention. This sliding portable telephone 1 of the embodiment includes an upper housing 2 and a lower housing 3. The upper housing 2 is slid with respect to the lower housing 3. There are provided a main display 4 which is a first display, a multiple function key 6 for carrying out various functions and a receiver 8 on a front side of the upper housing 2.

FIG. 1B is a view of the sliding portable telephone of FIG. 1A showing a state in which the upper housing 2 is slid and opened. On a face on the front side of the lower housing 3 which is exposed when the upper housing 2 is slid with respect to the lower housing 3, operation keys 7 such as a dial key and a microphone 9 are provided.

FIG. 1C is a view showing a back side of the sliding portable telephone 1 of FIG. 1B. On a back side of the upper housing 2, a sub-display 5 is provided which is a second display exposed when the lower housing 3 is opened. There are provided a lens 10 of a camera built in the lower housing 3 and an antenna 11 on the back side of the lower housing 3. Reference character 3B is a lid used when a battery, which is built in the lower housing 3, is replaced. Reference numeral 20 represents sliding rails used when the upper housing 2 is slid with respect to the lower housing 3. The sliding rails 20 will be explained in detail later.

In the sliding portable telephone 1 of the embodiment composed as described above, the camera lens 10 is arranged on the back side of the lower housing 3. Therefore, it is possible to use the sliding portable telephone 1 as a camera in the state shown in FIG. 1A while the main display 4 is being used as a display of the camera. Since a sub-display 5 is arranged on the back side of the upper housing 2 which has been opened, when an image viewed through the lens 10 is displayed on the sub-display 5, a user can take a photograph of himself holding the sliding portable telephone 1.

Since the portable telephone has multiple functions and it becomes possible to handle personal data and carry out monetary transactions. Therefore, the role of the portable telephone is getting important in society. Accordingly, security functions, which prohibit a stranger to use the portable telephone without permission of the owner thereof, are also important. As one of the security functions, a fingerprint sensor is provided in the portable telephone so as to carry out authentication. This fingerprint sensor is provided on the face of the portable telephone on which the operations keys are arranged. Alternatively, this fingerprint sensor is provided on the side of the housing of the telephone. In the case where the fingerprint sensor is provided in the sliding portable telephone, it is preferable that a distance of sliding of the upper housing with respect to the lower housing for ensuring a space to use the fingerprint sensor can be configured by feeling a click, that is, by feeling when the upper housing is lightly locked by the lower housing. Further, in order to put the fingerprint sensor into practical use, it is convenient to provide a structure in which the fingerprint sensor is checked at the time of extending the sliding portable telephone. In the present invention, the following two cases will be explained. One is a case in which the fingerprint sensor is provided on a face on which the operation keys of the portable telephone are provided. The other is a case in which the fingerprint sensor is provided on a side of the housing of the telephone. Preferred embodiments will be explained below for the above cases.

Figure 2:
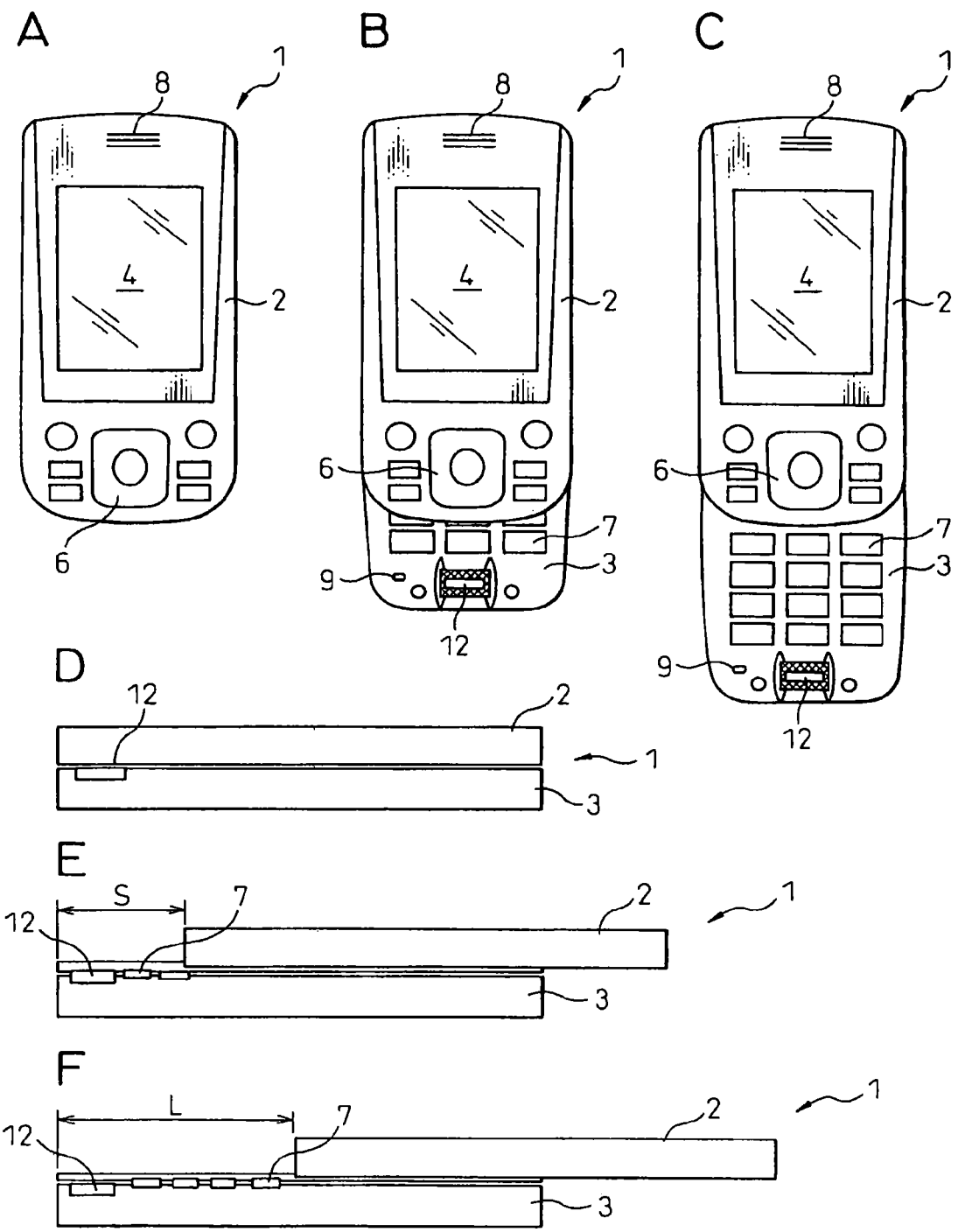
FIG. 2A is a front view showing a front side of a sliding portable telephone, which is in a closed state, of the second embodiment of the present invention.
FIG. 2B is a front view showing a half-open state of the sliding portable telephone of FIG. 2A.
FIG. 2C is a front view showing a full-open state of the sliding portable telephone of FIG. 2A.
FIG. 2D is a side view showing a state of FIG. 2A.
FIG. 2E is a side view showing a state of FIG. 2B.
FIG. 2F is a side view showing a state of FIG. 2C.

First, explanations will be made for a case in which the fingerprint sensor is arranged on the face on which the operation keys of the portable telephone are provided. FIG. 2A is a view showing a front side of the sliding portable telephone 1, which is in a closed state, of the second embodiment of the present invention. In the same manner as that of the sliding portable telephone 1 of the first embodiment, reference numeral 2 is an upper housing, reference numeral 4 is a main display, reference numeral 6 is a multiple function key and reference numeral 8 is a receiver. FIG. 2D is a side view showing an outline of the sliding portable telephone 1 shown in FIG. 2A. In the sliding portable telephone 1 of this embodiment, a finger print sensor 12 is provided in a portion of the lower housing 3 which is covered with the upper housing 2 in a closed state.

FIG. 2B is a view showing a half-open state in which the sliding portable telephone 1 of FIG. 2A is opened half. This half-open state is an intermediate state between the full-closed state and the full-open state, that is, this half-open state is a state in which the lower housing is opened by length S. FIG. 2E is a side view showing an outline of the sliding portable telephone 1. FIG. 2C is a view showing a full-open state of the sliding portable telephone 1 of FIG. 2B. In this case, the length in the full-open state of the sliding portable telephone 1 is L. FIG. 2F is a schematic illustration showing a side of the sliding portable telephone 1 of FIG. 2C. The fingerprint sensor 12 is arranged in a lower end portion of the lower housing 3. Therefore, a microphone 9 is arranged at a position being offset from the center. The fingerprint sensor 12 detects a fingerprint when a fingertip is placed on the fingerprint sensor 12.

In this embodiment, the upper housing 2 is lightly locked and stopped when it is moved with respect to the lower housing 3 by length S. In other words, the upper housing 2 is simply locked in the middle of its movement. Therefore, a movement of the upper housing 2 can be stopped at the point of time of appearance of the fingerprint sensor 12 without moving the upper housing 2 by the full-open length L. A length of sliding until the upper housing 2 is locked is determined by a size relation between the fingerprint sensor 12 and the finger. It is preferable that this length of sliding is about 25 mm which is a length to the first joint of the finger. In this connection, a necessary length of sliding until all keys of the numerical pad are exposed is about 40 to 50 mm. The length of sliding of the upper housing 2, at which the movement of the upper housing 2 is stopped when the fingerprint sensor 12 is exposed, varies according to a shape of the portable telephone and the sizes of parts or according to a method of operation of the portable telephone. Therefore, the length of sliding of the upper housing 2, at which the movement of the upper housing 2 is stopped when the fingerprint sensor 12 is exposed, is not limited to the above specific value.

Figure 3:
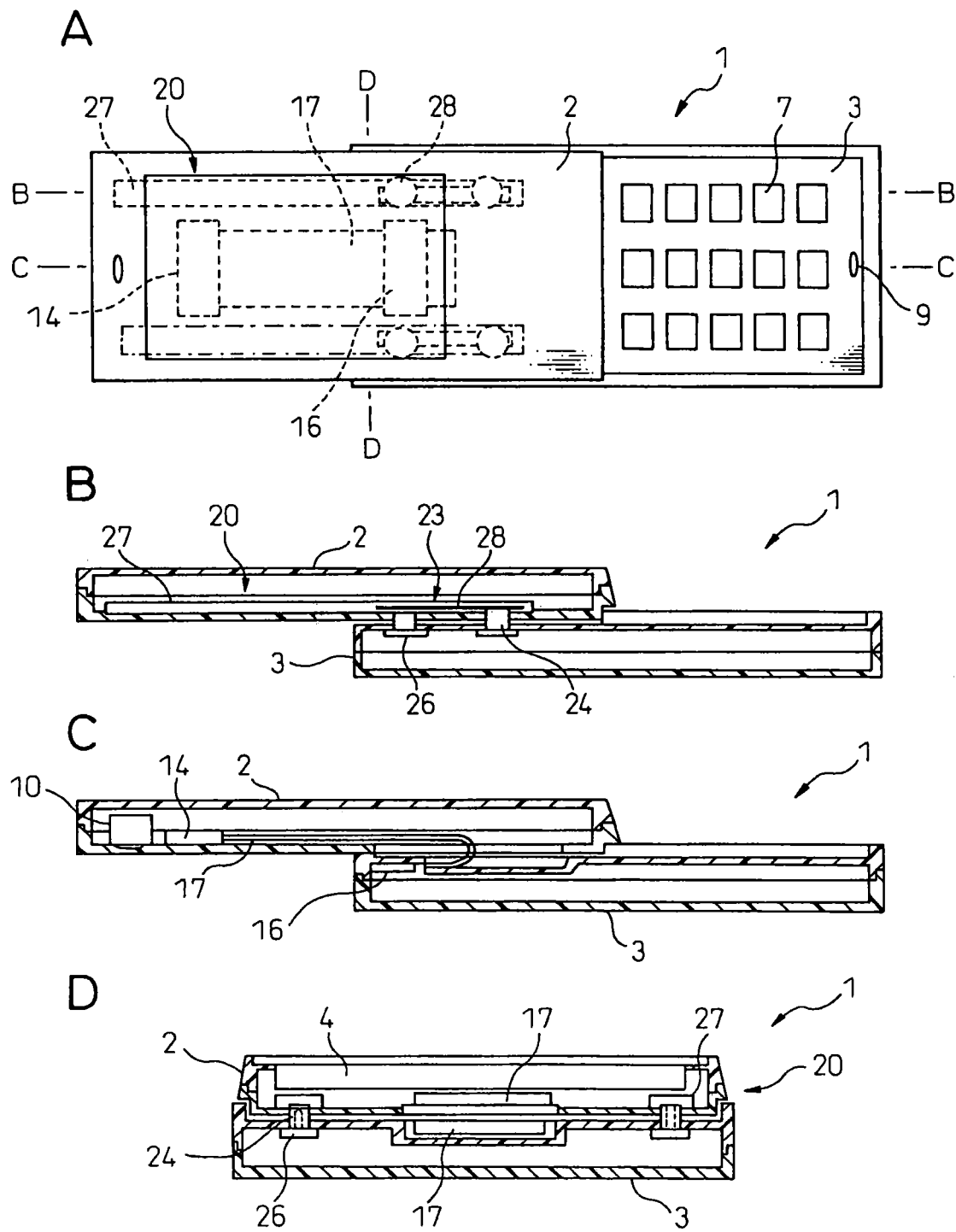
FIG. 3A is a plan view showing positions of a sliding mechanism and a flexible circuit board built in a sliding portable telephone of the present invention.
FIG. 3B is a sectional view taken on line B-B in FIG. 3A showing a position of a sliding rail built in a sliding portable telephone of the present invention.
FIG. 3C is a sectional view taken on line C-C in FIG. 3A showing a position of a flexible circuit board built in a sliding portable telephone of the present invention.
FIG. 3D is a sectional view taken on line D-D in FIG. 3A showing positions of a sliding rail and a flexible circuit board built in a sliding portable telephone of the present invention.

FIG. 3A is a view showing a position of a sliding rail 20, which is a sliding mechanism integrated into the sliding portable telephone 1 of the present invention, and also showing a position of a flexible circuit board 17. The sliding rail 20 includes a rail portion 27 and a slider 23 which moves in this rail portion 27. These components are referred to as a sliding module. Usually, two sets of sliding rails 20 are used in one sliding portable telephone. These two sets of sliding rails are arranged in parallel with each other. As shown in FIGS. 3B and 3D, the rail portion 27 of the sliding rail 20 is attached to the upper housing 2. A sliding plate 28 of the slider 23 is attached to the lower housing 2 with shafts 24 and screws 26.

Since the upper housing 2 is moved with respect to the lower housing 3 in the sliding portable telephone 1 of the present invention, it is necessary to provide a flexible circuit board 17 for connecting a circuit board built in the upper housing 2 with a circuit board built in the lower housing 3. As shown in FIGS. 3A and 3C, both end portions of this flexible circuit board 17 are respectively connected with connectors 14, 16. An intermediate portion of the flexible circuit board 17 is deformed when the upper housing 2 is moved. How to connect this flexible circuit board 17 with the upper housing 2 and the lower housing 3 will be explained in detail later.

FIG. 4A is an exploded view showing a constitution of the sliding rail 20 and the slider 23 used for the first embodiment of the present invention shown in FIGS. 1A to 1C. FIGS. 4B and 4C are views showing a state after the completion of assembling. The sliding rail 20 includes a rail portion 27 and a slider 23. The rail portion 27 is composed in such a manner that a long and slender upper cover 21 and a lower cover 22 are placed on each other. The slider 23 includes a sliding plate 28, two shafts 24, a plate spring 25 and screws 26.

On the upper cover 21 of the sliding rail 20, long sides, which are opposed to each other, and one short side are bent onto the lower cover 22 side and wall portions are formed. In a portion of a ceiling plate, a slit 21A, which becomes a running guide of the slider 23, is provided. In one end portion of the ceiling plate, an attaching protrusion is formed. On the other hand, on the lower cover 22, long sides, which are opposed to each other, and one short side are bent onto the upper cover 21 side and wall portions are formed. A space, which is ensured by these wall portions when the upper cover 21 and the lower cover 22 are placed on each other, becomes a running passage of the slider 23 described before. Although a bottom face of the lower cover 22 is flat, lock protrusions 22A are formed at both end portions. Sides of these lock protrusions 22A, which are opposed to each other, are formed into tapered faces. On one end portion of the lower cover 22, an attaching hole 22C is formed. The attaching protrusion 21C of the upper cover 21 and the attaching hole 22C of the lower cover are arranged so as to opposed to each other.

The slider 23 includes: a sliding plate 28 running in the rail portion 27; two shafts 24 protruding onto the sliding plate 28; a plate spring 25 mounted on the sliding plate 28 when the shafts 24 are inserted into the through-holes 25A; and screws 26 screwed into screw holes 24A of the shafts 24. On the front and the rear end portion of the sliding plate 28 in the sliding direction, lock portions 28A are provided which are engaged with the lock protrusions 22A formed on the lower cover 22. Before the upper cover 21 and the lower cover 22 are placed on each other, the slider 23 is set on the lower cover 22. After the shafts 24 have been inserted into the slit 21A, the upper cover 21 and the lower cover 22 are placed on each other and joined as shown in FIGS. 4B and 4C. The sliding plate 28 inserted into a space formed between the upper cover 21 and the lower cover 22 is pushed by a pushing force generated by the plate spring 25. Therefore, unless external force is applied to the sliding plate 28, the sliding plate 28 is not moved in the rail portion 27.

In the sliding portable telephone 1 of the present invention, the sliding rail 20 is fixed to the upper housing 2 and the slider 23 is fixed to the lower housing 3 by screws 26. Concerning the sliding rail 20 shown in FIG. 1C, a bottom face of the lower rail 22 is actually illustrated. Accordingly, in the sliding portable telephone 1 of the present invention, the sliding rail 20 is slid with respect to the fixed slider 23.

FIG. 5A is an exploded view showing the constitution of the sliding rail 20 and the slider 23 used for the second embodiment of the present invention shown in FIGS. 2A to 2F. Different points of the sliding rail 20 used for the second embodiment from the sliding rail 20 used for the first embodiment are only shapes of the lower cover 22 and the sliding plate 28. Therefore, like reference characters are used to indicate like parts in the first and the second embodiment and the explanations are omitted here. Only the different points will be explained below.

On the lower cover 22 of the sliding rail 20, lock protrusions 22A are formed on both end portions of the flat bottom face. Further, in the intermediate portion of the lower cover 22, intermediate lock protrusions 22B are formed. These intermediate lock protrusions 22B are provided only in proximity to both end portions of the lower cover 22. A portion between these intermediate lock protrusions 22B is flat. That is, the intermediate lock protrusions 22B arranged on both sides of the intermediate portion of the lower cover 22 are arranged in such a manner that two narrow wedge-shaped members are respectively opposed to each other through a small gap.

On the other hand, on the sliding plate 28 of the slider 23, the lock portion 28A explained in FIG. 4A is provided on one of the front and rear end portions in the sliding direction. In the other front and rear end portions in the sliding direction, a narrow lock portion 28B, the width of which is narrow because both sides of the lock portion 28A are shaved, is provided. Width of this narrow lock portion 28B is smaller than the distance between the intermediate lock protrusions 22B provided on both sides of the lower cover 22. Therefore, at the time of sliding the slider 23, the narrow lock portion 28B is not engaged with the intermediate lock protrusion 22B. The narrow lock portion 28B is engaged with the lock protrusion 22A formed on the lower cover 22. In this connection, the shapes of the lock portion 28A and the narrow lock portion 28B may not be a tapered wedge-shape. As shown in FIGS. 5B and 5C, the shapes of the lock portion 28A and the narrow lock portion 28B may be a curved protrusion. This intermediate lock position is a gap between the intermediate lock protrusions 22B. At this position, it is possible to adjust play at the time of locking the protruding size of the lock portion 28A of the sliding plate 28. In the intermediate portion of the lower cover 22, instead of the protrusion, a recess portion can be provided.

As shown in FIG. 5B, the slider 23 may be attached to the lower cover 22 so that the lock portion 28A can be located on the attaching hole 22C side. Alternatively, as shown in FIG. 5C, the slider 23 may be attached to the lower cover 22 so that the narrow lock portion 28B can be located on the attaching hole 22C side. In the case where the lower cover 22 is fixed to the upper housing 2 of sliding portable telephone 1, when the slider 23 is attached to the lower cover 22 so that the lock portion 28A can be located on the attaching hole 22C side, a sliding length of the slider 23 to the intermediate lock protrusion at the time of sliding the upper housing 2 is extended. When the slider 23 is attached to the lower cover 22 so that the narrow lock portion 28B can be located on the attaching hole 22C side, a sliding length of the slider 23 to the intermediate lock protrusion at the time of sliding the upper housing 2 is reduced. This will be explained referring to FIGS. 6A to 6C.

In the case where the lower cover 22 is fixed to the upper housing 2 of the sliding portable telephone 1, as shown in FIG. 5A, the slider 23 is attached so that the lock portion 28A can located on the attaching hole 22C side. In this case, as shown by the void arrow in FIG. 6A, when the upper housing is extended with respect to the lower housing, the narrow lock portion 28B is not engaged with the intermediate lock protrusion 22B. Therefore, the upper housing is not locked with respect to the lower housing. When the upper housing is further extended with respect to the lower housing, as shown in FIGS. 6B and 6C, the lock portion 28A is engaged with the intermediate lock protrusion 22B. Therefore, a sliding motion of the upper housing 2 is lightly locked. At this time, feeling a click is generated. Feeling a sound is also generated. Therefore, when the sliding motion of the upper housing 2 is stopped at this time, the upper housing 2 is stopped with respect to the lower housing 3 in a half-open state.

On the other hand, in the case where the lower cover 22 is fixed to the upper housing 2 of the sliding portable telephone 1, as shown in FIG. 5B, the slider 23 is attached to the lower cover 22 so that the lock portion 28A can be located on the attaching hole 22C side. In this case, in the state shown in FIG. 6A, the lock portion 28A is engaged with the intermediate lock protrusion 22B and a sliding motion of the upper housing 2 is lightly locked. Therefore, when the sliding motion of the upper housing 2 is stopped in this state, the upper housing 2 is stopped in a half-open state in which the upper housing 2 is stopped with respect to the lower housing 3 being slid a shorter distance.

As explained above, according to the structure of the sliding rail 20 explained in FIGS. 5A to 6C, the upper housing 2 of the sliding portable telephone 1 is locked with respect to the lower housing 3 at three positions, the minimum length position, the maximum length position and the intermediate length position. A sliding distance of the upper housing 2 with respect to the lower housing 3 is determined by a relation of the size between the fingerprint sensor 12 and the finger of a user. This sliding distance may be about 25 mm which is a length from the fingerprint sensor 12 to the first joint of the finger. In this connection, the sliding distance of the upper housing 2 with respect to the lower housing 3 in this intermediate state varies according to the specification of a product. Therefore, it is not limited to the above specific distance of 25 mm.

Next, explanations will be made into a case in which the fingerprint sensor is arranged on a side of the housing of the portable telephone. FIG. 7A is a view showing an arrangement of the sliding portable telephone 1 of the third embodiment of the present invention. In the sliding portable telephone 1 of the second embodiment of the present invention, the fingerprint sensor 12 is arranged on the lower end portion of the lower housing 3. However, in the sliding portable telephone 1 of the third embodiment, the fingerprint sensor 12 is arranged on a side of the neighborhood of the lower end portion of the main display 4 of the upper housing 2. This is a different point of the third embodiment from the second embodiment. The fingerprint sensor 12 of the third embodiment is different from the fingerprint sensor 12 of the second embodiment in that a fingerprint is detected when a fingertip is slid on the fingerprint sensor 12. The fingerprint sensor 12 of the third embodiment is of the type in which a fingerprint is detected when a fingertip is pressed onto the fingerprint sensor 12.

In the sliding portable telephone 1 of the third embodiment, in the case where the telephone is opened by sliding the upper housing 2 with respect to the lower housing 3, the thumb is placed on a portion of the fingerprint sensor 12 as shown in FIG. 7B. In this state, the upper housing 2 is pushed by the thumb. Then, while the fingerprint sensor 12 is detecting the fingerprint, the upper housing 2 is slid with respect to the lower housing 3. Accordingly, the upper housing can slide to a full-open state only by the operation of the thumb as shown in FIG. 7C.

In the third embodiment, the fingerprint sensor 12 functions as a finger putting portion and the finger is put on this portion. Then, the upper housing 2 of the sliding portable telephone 1 is slid with respect to the lower housing 3. Each time the above operation is conducted, fingerprint authentication of the operator of operating the sliding portable telephone 1 can be made. Accordingly, there is no possibility of a third person using the sliding portable telephone 1.

FIG. 8A is a view showing a front side of a sliding portable telephone 1 having a fingerprint sensor 12, which is in a closed state, of a variation of the third embodiment of the present invention. As shown in this embodiment, the fingerprint sensor 12 is not arranged obliquely which is unlike the fingerprint sensor 12 shown in FIG. 7A, but the fingerprint sensor 12 can be arranged in a direction perpendicular to the face on which the multiple function key 6 is arranged. In this connection, in the case where the fingerprint sensor 12 is arranged on the side of the upper housing 2 as shown in the third embodiment or as shown in the variation of the third embodiment and the fingerprint sensor 12 is given an oblique force F by the finger as shown in FIG. 8A when the upper housing 2 is opened while the finger is being put on the fingerprint sensor 12, this oblique force F is decomposed to force F1, which is a force to slide the upper housing 2, and force F2 which is a force to be given to the sliding portable telephone 1 in the lateral direction.

As described above, in the sliding portable telephone 1, the upper housing 2 of which is slid with respect to the lower housing 3, a thrust is given to the upper housing 2 in the lateral direction of the portable telephone 1. By this thrust given in the lateral direction, the sliding rail 20 of the sliding portable telephone 1 is given a load from the side and the sliding rail 20 is twisted in some cases. Therefore, in the present invention, as shown in FIG. 8B and FIG. 8C which is an enlarged view of FIG. 8B, a sliding assist member 33, the friction coefficient of which is low, is provided so that it can bear the load given in the lateral direction. The sliding assist member 33 is made of, for example, a polyacetal material (POM).

This sliding assist member 33, which has an L-shaped cross-section, can be arranged on a side wall 31, which is located at an end portion of the joining face of the upper housing 2 and the lower housing 3, and in a portion of the upper housing 2 opposed to this side wall 31. Even when this sliding assist member 33 receives load F2, it is possible to support load F2, and the sliding rail 20 can be moved smoothly due to this sliding assist member 33. As shown in FIG. 8D, it is possible to arrange four sliding assist members on the side wall 31 of the lower housing 3. Concerning the sliding assist member 33 arranged on the side wall 31 that is not given load F2 previously described, only a portion parallel with the recess portion 30 may be provided and it is possible to omit a portion perpendicular to the recess portion 30.

FIGS. 9A and 9B are views showing a sliding portable telephone 1 having a fingerprint sensor 12 of the fourth embodiment of the present invention. FIG. 9A is a view showing a state in which the sliding portable telephone 1 is opened. FIG. 9B is a view showing a state in which the sliding portable telephone 1 shown in FIG. 9A is fully opened. In this embodiment, a recess portion 18 is provided in a region between the main display 4 of the upper housing 2 and the multiple function key 6. In a bottom portion of this recess 18, the fingerprint sensor 12 is arranged.

Due to the above constitution, as shown in FIG. 9A, when a finger is put in the recess portion 18 and the upper housing 2 is being pushed open, fingerprint authentication of an operator can be made by the fingerprint sensor 12 provided on the bottom face of the recess portion 18. Fingerprint authentication made by the fingerprint sensor 12 can be conducted in a period of time from when the operator puts the finger in the recess portion 18 to when the upper housing 2 is fully opened as shown in FIG. 9B.

FIG. 10A is a view showing cross-sections of only the upper housing 2 and the lower housing 3 of the sliding portable telephone 1 of the fourth embodiment of the present invention. As described before, the conventional sliding portable telephone 1 has no water-proof structure of the flexible circuit board for connecting the upper and the lower housing with each other. Therefore, in this embodiment, in the upper housing 2, a flexible circuit board accommodating portion 42, which is recessed from the sliding face, is provided and a slit 44, into which the flexible circuit board is inserted, is provided on a face located in the sliding direction of this flexible circuit board accommodating portion 42. In the same manner, in the lower housing 3, a flexible circuit board accommodating portion 43, which is recessed from the sliding face, is provided. On a face located in the sliding direction of this flexible circuit board accommodating portion 43, a slit 46, into which the flexible circuit board is inserted, is provided.

FIGS. 10B and 10C are enlarged views of slits 44, 46. FIGS. 10B and 10C show shapes of sealing members 34, 36 to be fitted into these portions. FIG. 10D is a view showing widths of the flexible circuit board accommodating portions 42, 43 and shapes of the slits 44, 46 together with the circuit boards 13, 15 built in the upper housing 2 and the lower housing 3. In the slits 44, 46, recess portions 45, 47, into which sealing members (gasket) 34, 36 are fitted, are provided. The sealing members 34, 36 are fitted into recess portions 45, 47 provided on both sides of the slits 44, 46. Accordingly, the sealing members 34, 36 can be easily positioned and attached. Further, water-droplet-proof can be enhanced.

Sizes of the slits 44, 46 can be determined by the width and thickness of the flexible circuit board. Widths of the sealing members 34, 36 fitted into the slits 44, 46 are larger than the width of the flexible circuit board 17. In the sealing members 34, 36, through-holes 34A, 36A, into which the flexible circuit board 17 is inserted, are provided. Sizes of the through-holes 34A, 36A are appropriate for inserting the flexible circuit board 17 under a watertight condition. When the flexible circuit board 17 is inserted into the sealing members 34, 36, the flexible circuit board 17 is covered with sealing members 34, 36. However, in order to prevent water traveling along the flexible circuit board 17, it is possible to adopt a structure in which the flexible circuit board 17 is vertically interposed between the sealing members, the widths of which are the same as the width of the flexible circuit board 17. In this case, a labyrinth structure may be adopted. However, it should be noted that the structure of the sealing member used for the present invention is not limited to the above specific structure.

FIGS. 11A and 11B are views showing a sliding portable telephone 1 of the fourth embodiment of the present invention. FIGS. 11A and 11B show a flexible circuit board 17 for connecting the connectors 14, 16 provided on the circuit boards 13, 15 which are built in the upper housing 2 and the lower housing 3. FIGS. 11A and 11B also show sealing members 34, 36, into which the flexible circuit board 17 is inserted in the slits 44, 46, for sealing the flexible circuit board 17 so that liquid can not enter the upper housing 2 or the lower housing 3. FIG. 11A is a view showing a state in which the upper housing 2 and the lower housing 3 are closed to each other. FIG. 11B is a view showing a state in which the upper housing 2 and the lower housing 3 are fully opened. FIG. 11C is an upper view of the portable telephone 1 which is fully opened.

In the state in which the upper housing 2 and the lower housing 3 are closed to each other, the flexible circuit board 17 is folded back into a U-shape outside the sealing member 34 and made to pass through the flexible circuit board accommodating portion 43 and reaches the sealing member 36. When the upper housing 3 is slid with respect to the lower housing 3 in the state shown in FIG. 11A, a portion of the flexible circuit board 17 located in the flexible circuit board accommodating portion 43 is gradually moved into the flexible circuit board accommodating portion 42. In this case, the flexible circuit board 17 located between the connector 14 and the sealing member 34 is not changed even when the upper housing 2 is slid with respect to the lower housing 3. The flexible circuit board 17 located between the connector 16 and the sealing member 36 is not changed even when the upper housing 2 is slid with respect to the lower housing 3.

As described above, in the sliding portable telephone 1 of the present invention, only by slits 44, 46 arranged at the end portions of the flexible circuit board accommodating portions 42, 43 provided on the sliding faces of the upper housing 2 and the lower housing 3, the flexible circuit board accommodating portions 42, 43 are communicate with portions of the upper housing 2 and the lower housing 3. These portions are sealed by the water-proof sealing members 34, 36. Therefore, no droplets enter the inside of the upper housing 2 and the lower housing 3.

In this connection, in the embodiment explained above, the sliding rail 20 is provided on a joining face of the upper housing 1 and the lower housing 2 of the portable telephone 1. However, the following structure can be adopted. As shown in FIGS. 12A and 12B, the side of the upper housing 2 is extended onto the lower housing 3 side so as to provide an extended portion 2E. The slider 23 of the sliding rail 20 is built in this extended portion 2E and the rail portion 27 of the sliding rail 20 is built on the side of the lower housing 3. In this case, the extended portion 2E can be composed as shown in FIGS. 12C and 12D.

Further, as shown in FIGS. 13A and 13B, sides of the lower housing 3 are extended onto the upper housing 2 side to provide the extending portions 3E. The slider 23 of the sliding rails 20 are built in these extending portions 3E and the rail portions 27 of the sliding rails 20 are built on the sides of the upper housing 2. In this case, the structure of the extending portion 3E can be formed as shown in FIGS. 13C and 13D.

The invention claimed is:

1. A sliding portable apparatus in which an upper housing and a lower housing overlap each other when in an overlapped state, and overlapping faces of the upper housing and the lower housing, respectively, are gradually exposed when the upper housing and the lower housing are slid from each other from the overlapped state in a sliding direction using sliding rails arranged in parallel, the sliding portable apparatus further comprising:
an operating portion having keys provided on the overlapping face of the lower housing and which is exposed when the upper housing and the lower housing are slid from each other;
a display portion provided on a face of the upper housing which is exposed at all times; and
a fingerprint sensor provided on a bottom face of a recess on the face of the upper housing, and which is touched by a finger in fingerprint recognition.

2. A sliding portable apparatus in which an upper housing and a lower housing overlap each other when in an overlapped state, and overlapping faces of the upper housing and the lower housing, respectively, are gradually exposed when the upper housing and the lower housing are slid from each other from the overlapped state in a sliding direction using sliding rails arranged in parallel, the sliding portable apparatus further comprising:
keys provided on the overlapping face of the lower housing and which are exposed when the upper housing and the lower housing are slid from each other;
a display provided on a face of the upper housing which is exposed at all times; and
a fingerprint sensor provided on a bottom face of a recess on the face of the upper housing, and which is touched by a finger in fingerprint recognition.

3. The sliding portable apparatus as in claim 1, wherein the fingerprint sensor is provided on the bottom face of the recess on the face of the upper housing so that, when a finger is put in the recess to thereby slide the upper housing and the lower housing from each other from the overlapped state, fingerprint authentication is made by the fingerprint sensor in a period of time from when the finger is put in the recess to when the upper housing is fully opened from the overlapped state.

4. The sliding portable apparatus as in claim 2, wherein the fingerprint sensor is provided on the bottom face of the recess on the face of the upper housing so that, when a finger is put in the recess to thereby slide the upper housing and the lower housing from each other from the overlapped state, fingerprint authentication is made by the fingerprint sensor in a period of time from when the finger is put in the recess to when the upper housing is fully opened from the overlapped state.

* * * * *